US012666455B2

(12) United States Patent
Boudreau et al.

(10) Patent No.: US 12,666,455 B2
(45) Date of Patent: Jun. 23, 2026

(54) INTERFERENCE ROBUST ADAPTIVE TDD CONFIGURATION WITH MULTI-TRP

(71) Applicant: Telefonaktiebolaget LM Ericsson (publ), Stockholm (SE)

(72) Inventors: Gary Boudreau, Kanata (CA); Kumar Balachandran, Pleasanton, CA (US); Virgil Cimpu, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 451 days.

(21) Appl. No.: 18/042,354

(22) PCT Filed: Oct. 30, 2020

(86) PCT No.: PCT/IB2020/060241
§ 371 (c)(1),
(2) Date: Feb. 21, 2023

(87) PCT Pub. No.: WO2022/043742
PCT Pub. Date: Mar. 3, 2022

(65) Prior Publication Data
US 2023/0328767 A1 Oct. 12, 2023

Related U.S. Application Data

(60) Provisional application No. 63/070,041, filed on Aug. 25, 2020.

(51) Int. Cl.
| *H04W 72/541* | (2023.01) |
| *H04L 5/00* | (2006.01) |
| *H04L 5/14* | (2006.01) |
| *H04W 72/0446* | (2023.01) |

(52) U.S. Cl.
CPC ......... *H04W 72/541* (2023.01); *H04L 5/0035* (2013.01); *H04L 5/1469* (2013.01); *H04W 72/0446* (2013.01)

(58) Field of Classification Search
CPC ........... H04W 72/541; H04W 72/0446; H04W 56/001; H04L 5/0035; H04L 5/1469; H04L 5/0091
See application file for complete search history.

(56) References Cited

U.S. PATENT DOCUMENTS

| 9,820,250 B2 | 11/2017 | Maltsev et al. | |
| 2014/0177456 A1* | 6/2014 | Boudreau | H04L 1/0003 370/252 |

(Continued)

FOREIGN PATENT DOCUMENTS

| WO | WO-2009070606 A2 * | 6/2009 | ........... H04W 16/28 |
| WO | WO-2020068127 A1 * | 4/2020 | ........... H04W 88/04 |

OTHER PUBLICATIONS

International Search Report and Written Opinion dated Apr. 12, 2021 issued in PCT Application No. PCT/IB2020/060241 filed Oct. 30, 2020, consisting of 16 pages.

(Continued)

*Primary Examiner* — Edan Orgad
*Assistant Examiner* — Samuel Roberge Bettendorf
(74) *Attorney, Agent, or Firm* — Sonoda & Kobayashi Intellectual Property Law; Darren M. Gardner

(57) ABSTRACT

A method, system and apparatus are disclosed for interference robust adaptive Time Division Duplex (TDD) configuration with multiple Transmit Receive Points (multi-TRP). A method implemented in a wireless node includes determining at least one time resource in which at least a part of a first time division duplex, TDD, configuration used in a first network supported by a first network node does not correspond to a second TDD configuration used in a second network supported by a second network node; and applying at least one interference mitigation procedure during at least the at least one time resource.

32 Claims, 13 Drawing Sheets

(56) References Cited

U.S. PATENT DOCUMENTS

| 2015/0333877 | A1* | 11/2015 | Rahman | H04L 1/1887 |
| | | | | 370/280 |
| 2016/0014791 | A1* | 1/2016 | Liu | H04W 24/08 |
| | | | | 370/252 |
| 2017/0069967 | A1* | 3/2017 | Shrekenhamer | H01Q 1/28 |
| 2020/0221464 | A1 | 7/2020 | Nielsen et al. | |

OTHER PUBLICATIONS

3GPP TSG RAN Meeting 80; RP-180675; Source: Qualcomm Incorporated; Title: Discussion of Response LS to CEPT; Agenda Item: 7; Document for: Discussion/Decision; La Jolla, CA, Jun. 11-14, 2018, consisting of 6 pages.

3GPP TSG RAN WG1 #86-bis; R1-1609125; Source: Samsung; Title: Inter-cell Interference Management for Uncoordinated TDD; Document for: Discussion and Decision; Agenda Item: 8.1.6.1; Lisbon, Portugal, Oct. 10-14, 2016, consisting of 4 pages.

3GPP TR 38.828 V0.1.0 (May 2019) 3rd Generation Partnership Project; Technical Specification Group Radio Access Network; Cross Link Interference (CLI) Handling and Remote Interference Management (RIM) for NR; (Release 16), consisting of 27 pages.

3GPP TSG-RAN WG4 Meeting #91 R4-1907599; Source: Huawei; Title: TP to TR 38.828—clean up—cover; Document for: Approval; Reno, USA, May 13-17, 2019, consisting of 1 page.

Ankit Choudhary, A Hands-On Introduction to Deep Q-Learning Using OpenAI Gym in Python; Apr. 18, 2019, consisting of 12 pages.

Hiyejin Kim, Dynamic TDD Systems for 5G and Beyond: A Survey of Cross-Link Interference Mitigation; IEEE Communications Surveys & Tutorials, vol. 22, No. 4, Fourth Quarter 2020; consisting of 34 pages.

* cited by examiner

Legend:
-Network 1 is victim system
-Network 2 is aggressor system
-Solid lines denote desired/intended signal transmission
-Dashed lines denote interfering signal
-Dash dotted lines denote hotspot

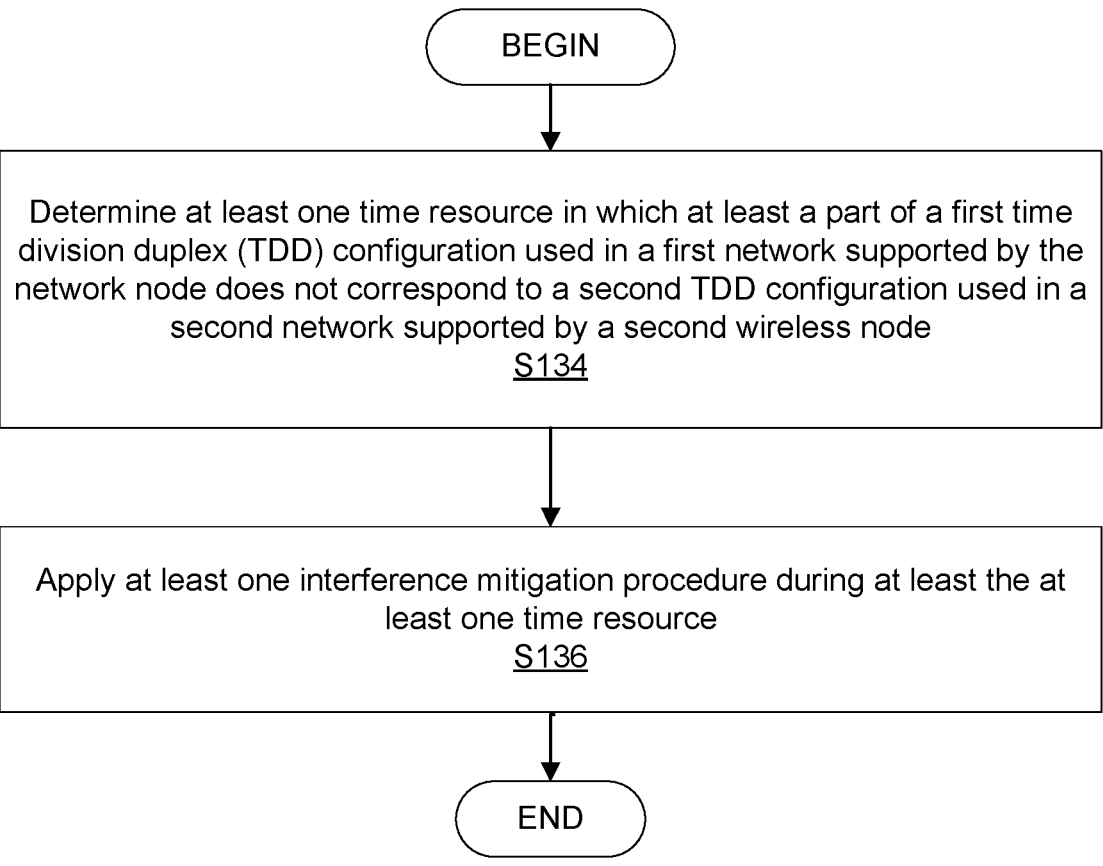

Determine at least one time resource in which at least a part of a first time division duplex (TDD) configuration used in a first network supported by the network node does not correspond to a second TDD configuration used in a second network supported by a second wireless node
S134

Apply at least one interference mitigation procedure during at least the at least one time resource
S136

FIG. 8

INTERFERENCE ROBUST ADAPTIVE TDD CONFIGURATION WITH MULTI-TRP

CROSS-REFERENCE TO RELATED APPLICATIONS

This application is a Submission Under 35 U.S.C. § 371 for U.S. National Stage Patent Application of International Application No.: PCT/IB2020/060241, filed Oct. 30, 2020 entitled "INTERFERENCE ROBUST ADAPTIVE TDD CONFIGURATION WITH MULTI-TRP," which claims priority to U.S. Provisional Application No. 63/070,041, filed Aug. 25, 2020, entitled "INTERFERENCE ROBUST ADAPTIVE TDD CONFIGURATION WITH MULTI-TRP," the entireties of both of which are incorporated herein by reference.

TECHNICAL FIELD

The present disclosure relates to wireless communications, and in particular, to interference robust adaptive Time Division Duplex (TDD) configuration with multiple Transmit Receive Points (multi-TRP).

BACKGROUND

For scenarios in which multiple networks are deployed in a co-located region by differing operators employing Time Division Duplex (TDD) transmission, the differing networks can cause significant interference to each other if they are not synchronized or employ differing TDD configurations (see FIG. 1, for example). This problem can be significant in particular for indoor enterprise deployments (such as, for example, hotels) or public venues such as sports stadiums, train stations, convention centers or airports in which multiple operators each deploy network coverage. Such co-located interference scenarios are relevant for TDD network deployments for both co-channel as well as adjacent channel deployments. Even for scenarios in which different TDD network deployments are time synchronized at a frame timing level, severe interference can still occur between the two networks if the TDD configurations employed by the two networks are not aligned in terms of UL and DL transmissions at a subframe level occurring at the same time. The term "coordinated" describes two TDD networks that are both (i) synchronized in time at frame boundaries and as well, (ii) both networks employ the same UL/DL configuration or pattern of subframes within a frame. Conversely, the term "uncoordinated" describes two TDD networks that (i) are synchronized in time at frame boundaries and as well, (ii) employ the different UL/DL configuration or pattern of subframes within a frame.

SUMMARY

Some embodiments advantageously provide methods, systems, and apparatuses for interference robust adaptive Time Division Duplex (TDD) configuration with multiple Transmit Receive Points (multi-TRP).

A method implemented in a network node includes determining at least one time resource in which at least a part of a first time division duplex (TDD) configuration used in a first network supported by the network node does not correspond to a second TDD configuration used in a second network supported by a second wireless node; and applying at least one interference mitigation procedure during at least the at least one time resource.

A method implemented in a wireless device includes determining at least one time resource in which at least a part of a first time division duplex (TDD) configuration used in a first network supported by a network node does not correspond to a second TDD configuration used in a second network supported by a second wireless node; and applying at least one interference mitigation procedure during at least the at least one time resource.

According to an aspect of the present disclosure, a method implemented in a wireless node is provided. The method includes determining at least one time resource in which at least a part of a first time division duplex, TDD, configuration used in a first network supported by a first network node does not correspond to a second TDD configuration used in a second network supported by a second network node; and applying at least one interference mitigation procedure during at least the at least one time resource.

In some embodiments of this aspect, determining the at least one time resource in which the at least the part of the first TDD configuration used in the first network supported by the first network node does not correspond to the second TDD configuration used in the second network supported by the second network node includes: determining the at least one time resource in which a communication direction within the first TDD configuration corresponding to the first network is not a same as a communication direction within the second TDD configuration corresponding to the second network.

In some embodiments of this aspect, determining comprises detecting the at least one time resource in which the at least the part of the first TDD configuration used in the first network supported by the first network node does not correspond to the second TDD configuration used in the second network supported by the second network node. In some embodiments of this aspect, determining comprises monitoring subframes in the first TDD configuration over a measurement time interval to determine at least one of a timing and an uplink-downlink pattern of a signal, the signal being associated with the second TDD configuration.

In some embodiments of this aspect, the method further includes measuring a signal quality of a signal; when the signal quality is below a predetermined threshold, determining a level of interference of the signal; and wherein determining the at least one time resource is performed as a result of the level of interference exceeding a predetermined threshold. In some embodiments of this aspect, the method further includes detecting an angle of arrival, AoA, of an interfering signal; and wherein applying the at least one interference mitigation procedure comprises using the AoA to apply the at least one interference mitigation procedure to mitigate the interfering signal during the at least one time resource. In some embodiments of this aspect, the at least one time resource comprises at least one subframe within at least one of the first TDD configuration and the second TDD configuration.

In some embodiments of this aspect, applying the at least one interference mitigation procedure comprises boosting a transmit power of signaling within at least one of the first and second network during the determined at least one time resource. In some embodiments of this aspect, applying the at least one interference mitigation procedure comprises adding at least one transmit receive point, TRP, node to a coordinated multi-point, CoMP, set. In some embodiments of this aspect, applying the at least one interference mitigation procedure comprises beamforming in a direction of a desired signal during the determined at least one time resource, the desired signal being associated with the first network.

In some embodiments of this aspect, the method further includes using a reinforcement learning algorithm to select a combination of interference mitigation procedures to apply. In some embodiments of this aspect, the reinforcement learning algorithm is based at least in part on at least one of a measured performance metric, a presence of interference and a detected time division duplex, TDD, pattern. In some embodiments of this aspect, applying the at least one interference mitigation procedure during the at least the at least one time resource comprises causing at least one of attenuating an interfering signal, redirecting a desired signal and amplifying the desired signal via at least one active antenna metasurface. In some embodiments of this aspect, applying the at least one interference mitigation procedure during the at least the at least one time resource comprises causing a re-transmission of a desired signal via at least one mobile relay.

In some embodiments of this aspect, applying the at least one interference mitigation procedure comprises null-steering in a direction of an interfering signal during the determined at least one time resource, the interfering signal being associated with the second network. In some embodiments of this aspect, the wireless node is one of the first network node and the second network node. In some embodiments of this aspect, the wireless node is a user equipment communicating in one of the first network and the second network.

According to yet another aspect of the present disclosure, a wireless node is provided. The wireless node includes processing circuitry. The processing circuitry is configured to cause the wireless node to determine at least one time resource in which at least a part of a first time division duplex, TDD, configuration used in a first network supported by a first network node does not correspond to a second TDD configuration used in a second network supported by a second network node; and apply at least one interference mitigation procedure during at least the at least one time resource.

In some embodiments of this aspect, the processing circuitry is configured to cause the wireless node to determine by being configured to cause the wireless node to determine the at least one time resource in which a communication direction within the first TDD configuration corresponding to the first network is not a same as a communication direction within the second TDD configuration corresponding to the second network. In some embodiments of this aspect, the processing circuitry is configured to cause the wireless node to determine by being configured to cause the wireless node to detect the at least one time resource in which the at least the part of the first TDD configuration used in the first network supported by the first network node does not correspond to the second TDD configuration used in the second network supported by the second network node.

In some embodiments of this aspect, the processing circuitry is configured to cause the wireless node to determine by being configured to monitor subframes in the first TDD configuration over a measurement time interval to determine at least one of a timing and an uplink-downlink pattern of a signal, the signal being associated with the second TDD configuration. In some embodiments of this aspect, the processing circuitry is configured to cause the wireless node to measure a signal quality of a signal; when the signal quality is below a predetermined threshold, determine a level of interference of the signal; and determine the at least one time resource as a result of the level of interference exceeding a predetermined threshold.

In some embodiments of this aspect, the processing circuitry is further configured to cause the wireless node to detect an angle of arrival, AoA, of an interfering signal; and apply the at least one interference mitigation procedure by being configured to use the AoA to apply the at least one interference mitigation procedure to mitigate the interfering signal during the at least one time resource. In some embodiments of this aspect, the at least one time resource comprises at least one subframe within at least one of the first TDD configuration and the second TDD configuration.

In some embodiments of this aspect, the processing circuitry is configured to cause the wireless node to apply the at least one interference mitigation procedure by being configured to cause the wireless node to boost a transmit power of signaling within at least one of the first and second network during the determined at least one time resource. In some embodiments of this aspect, the processing circuitry is configured to cause the wireless node to apply the at least one interference mitigation procedure by being configured to cause the wireless node to add at least one transmit receive point, TRP, node to a coordinated multi-point, CoMP, set.

In some embodiments of this aspect, the processing circuitry is configured to cause the wireless node to apply the at least one interference mitigation procedure by being configured to cause the wireless node to beamform in a direction of a desired signal during the determined at least one time resource, the desired signal being associated with the first network. In some embodiments of this aspect, the processing circuitry is configured to cause the wireless node to apply the at least one interference mitigation procedure by being configured to cause the wireless node to null-steer in a direction of an interfering signal during the determined at least one time resource, the interfering signal being associated with the second network.

In some embodiments of this aspect, the wireless node is one of the first network node and the second network node. In some embodiments of this aspect, the wireless node is a user equipment communicating in one of the first network and the second network.

In some embodiments of this aspect, the processing circuitry is further configured to cause the wireless node to use a reinforcement learning algorithm to select a combination of interference mitigation procedures to apply. In some embodiments of this aspect, the reinforcement learning algorithm is based at least in part on at least one of a measured performance metric, a presence of interference and a detected time division duplex, TDD, pattern. In some embodiments of this aspect, the processing circuitry is configured to cause the wireless node to apply the at least one interference mitigation procedure during the at least the at least one time resource by being configured to cause at least one of attenuating an interfering signal, redirecting a desired signal and amplifying the desired signal via at least one active antenna metasurface. In some embodiments of this aspect, the processing circuitry is configured to cause the wireless node to apply the at least one interference mitigation procedure during the at least the at least one time resource by being configured to cause a re-transmission of a desired signal via at least one mobile relay.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flowchart of an exemplary process in a network node according to some embodiments of the present disclosure;

DETAILED DESCRIPTION

Figure 1:
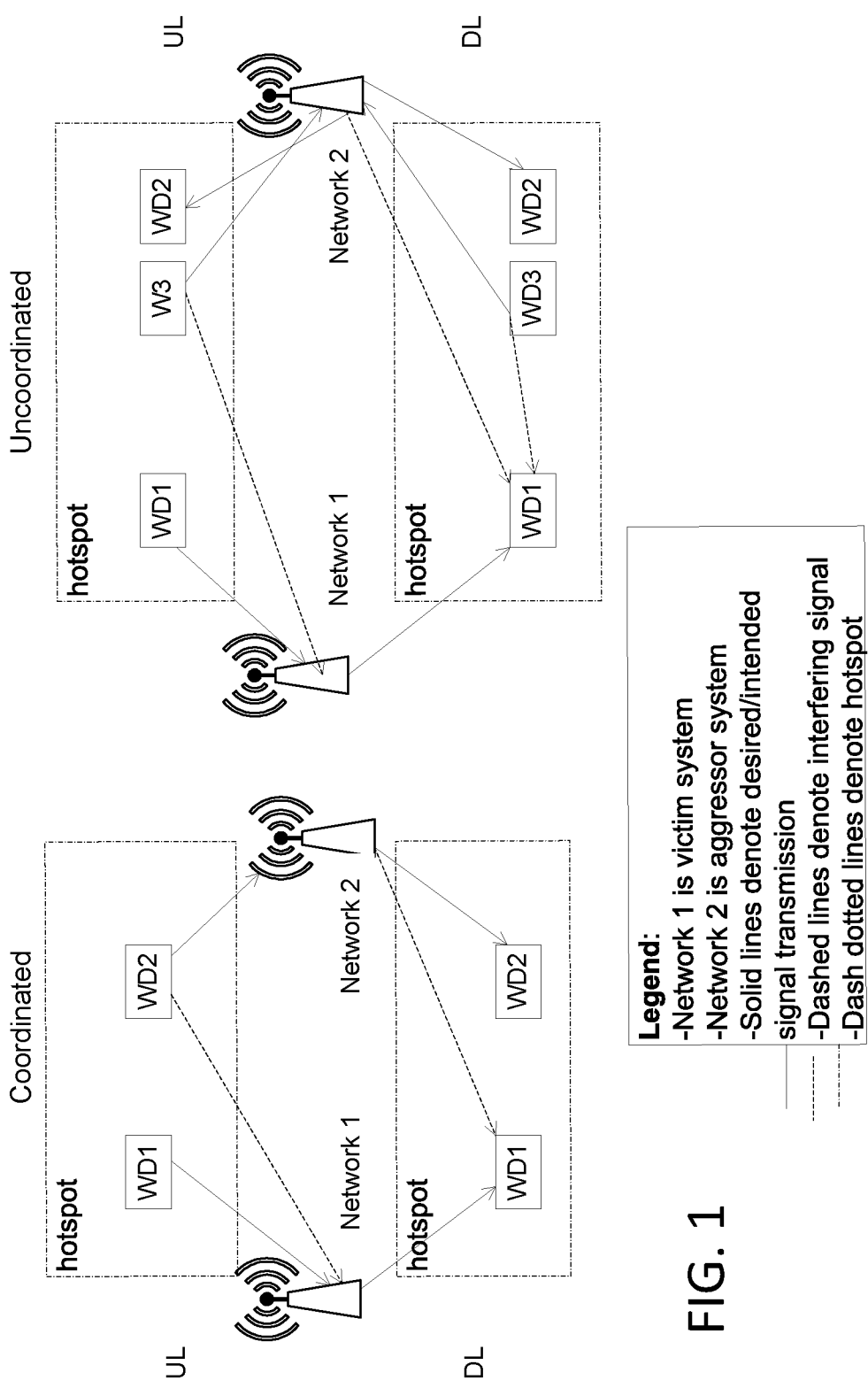
FIG. 1 illustrates an example of interference impacts of coordinated and uncoordinated TDD networks.

Existing solutions for mitigating interference between deployments of co-located or proximate TDD networks from competing operators on the same or adjacent frequency spectrum channels typically rely on employing one of physical separation of the deployed network node, guard bands, enhanced filtering between channels or more stringent requirements such as synchronization of the TDD transmissions and use of the same TDD configurations or patterns of UL and DL transmission intervals. Use of these techniques can be expensive in terms of network node filtering hardware and/or inefficient in terms of spectral efficiency and capacity of the networks.

In some embodiments of the present disclosure, for co-located or proximate TDD networks that are employing differing TDD configurations with co-channel or adjacent channel transmissions, arrangements are defined to adaptively employ interference mitigation techniques during periods of mismatched TDD configuration. The interference mitigation arrangement includes use of one or more of power control, addition of TRP nodes to a coordinated multi-point (CoMP) set, beamforming and null-steering.

Some embodiments of the present disclosure provide arrangements to mitigate co-channel and adjacent channel interference between co-located or proximate TDD networks that are unsynchronized in time and/or TDD UL/DL configuration patterns. The arrangements may achieve significant interference mitigation without the need for expensive additional filtering or spectrally inefficient use of guard bands. Furthermore, some embodiments are based on local measurements at a given network node (e.g., base station) or wireless node, and do not require significant additional signaling overhead to implement.

Before describing in detail exemplary embodiments, it is noted that the embodiments reside primarily in combinations of apparatus components and processing steps related to interference robust adaptive Time Division Duplex (TDD) configuration with multiple Transmit Receive Points (multi-TRP). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of TRP, base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" or "wireless node" used herein may be used to also denote a wireless device (WD) or a radio network node (NN).

In some embodiments, the non-limiting terms wireless device (WD) or a user equipment (UE) are used interchangeably. The WD/UE herein can be any type of wireless device capable of communicating with a network node or another WD over radio signals. The WD/UE may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Figure 12:
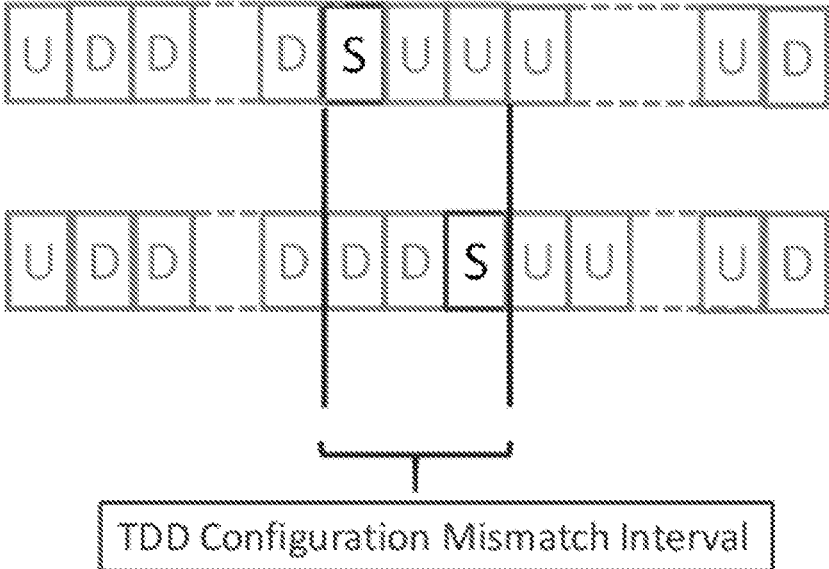
FIG. 12 illustrates an example TTD Configuration Mismatch Interval according to some embodiments of the present disclosure.

Some embodiments of the present disclosure describe at least a part of a first TDD configuration not corresponding to a second TDD configuration. It should be understood that such embodiments encompass both full and even partial TDD configuration mismatches, where, for example, only a subset of the second TDD configuration is not time aligned with a subset of the first TDD configuration (see for example FIG. 12 illustrating a TDD configuration mismatch interval in which the first and second TDD configurations are e.g., partially time misaligned). In some embodiments, the terms, "transmit receipt point (TRP)", "wireless node" and/or "network node" may be used interchangeably. In some embodiments, a "wireless node" may be wireless device, a network node and/or a TRP. In some embodiments, the "receiver" may be, for example, a radio interface, of one or more of a wireless device, a network node and/or a TRP.

In some embodiments, the term "desired signal" is used and may comprise a transmission of wanted information from a transmitting wireless network node or device to a receiving wireless device or node.

In some embodiments, the term "metasurface" is used and may refer to a physical structure, typically planar, comprised of material layers that passively allow or inhibit the propagation of electromagnetic waves and/or actively retransmit the electromagnetic wave in a desired direction.

In some embodiments, the term "mobile relay" is used and may refer to a wireless network node that is mobile and as such can be actively relocated over time in a network, for example by pedestrians, vehicles, trains or drones.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

Any two or more embodiments described in this disclosure may be combined in any way with each other.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio measurement" used herein may refer to any measurement performed on radio signals. Radio measurements can be absolute or relative. Radio measurement may be called as signal level which may be signal quality and/or signal strength. Radio measurements can be e.g. intra-frequency, inter-frequency, inter-RAT measurements, CA measurements, etc. Radio measurements can be unidirectional (e.g., DL or UL) or bidirectional (e.g., Round Trip Time (RTT), Receive-Transmit (Rx-Tx), etc.). Some examples of radio measurements: timing measurements (e.g., Time of Arrival (TOA), timing advance, RTT, Reference Signal Time Difference (RSTD), Rx-Tx, propagation delay, etc.), angle measurements (e.g., angle of arrival), power-based measurements (e.g., received signal power, Reference Signals Received Power (RSRP), received signal quality, Reference Signals Received Quality (RSRQ), Signal-to-interference-plus-noise Ratio (SINR), Signal Noise Ratio (SNR), interference power, total interference plus noise, Received Signal Strength Indicator (RSSI), noise power, etc.), cell detection or cell identification, radio link monitoring (RLM), system information (SI) reading, etc. The inter-frequency and inter-RAT measurements are carried out by the WD in measurement gaps unless the WD is capable of doing such measurement without gaps.

In some embodiments, control information on one or more resources may be considered to be transmitted in a message having a specific format. A message may comprise or represent bits representing payload information and coding bits, e.g., for error coding.

Receiving (or obtaining) control information may comprise receiving one or more control information messages (e.g., CSI measurement report). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

An indication (e.g., an indication of TDD configuration pattern, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or gNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

In some embodiments, the term communication direction is intended to indicate an UL communication direction (i.e., communications from the WD to the network node) and/or a DL communication direction (i.e., communications in a direction from the network node to the WD).

The term time resource used herein may correspond to any type of physical resource or radio resource expressed in terms of length of time. Examples of time resources are: symbol, time slot, sub-slot, subframe, radio frame, TTI, interleaving time, etc. As used herein, in some embodiments, the terms "subframe," "slot," "sub-slot", "sub-frame/slot" and "time resource" are used interchangeably and are intended to indicate a time resource and/or a time resource number.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

In some embodiments, the term "obtain" or "obtaining" is used herein and may indicate obtaining in e.g., memory such as in the case where the information is predefined. The term "obtain" or "obtaining" as used herein may also indicate obtaining by receiving signaling indicating the information obtained. In some embodiments, a "set" as used herein may be a set of 1 or more elements in the set.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide interference robust adaptive Time Division Duplex (TDD) configuration with multiple Transmit Receive Points (multi-TRP).

Figure 2:
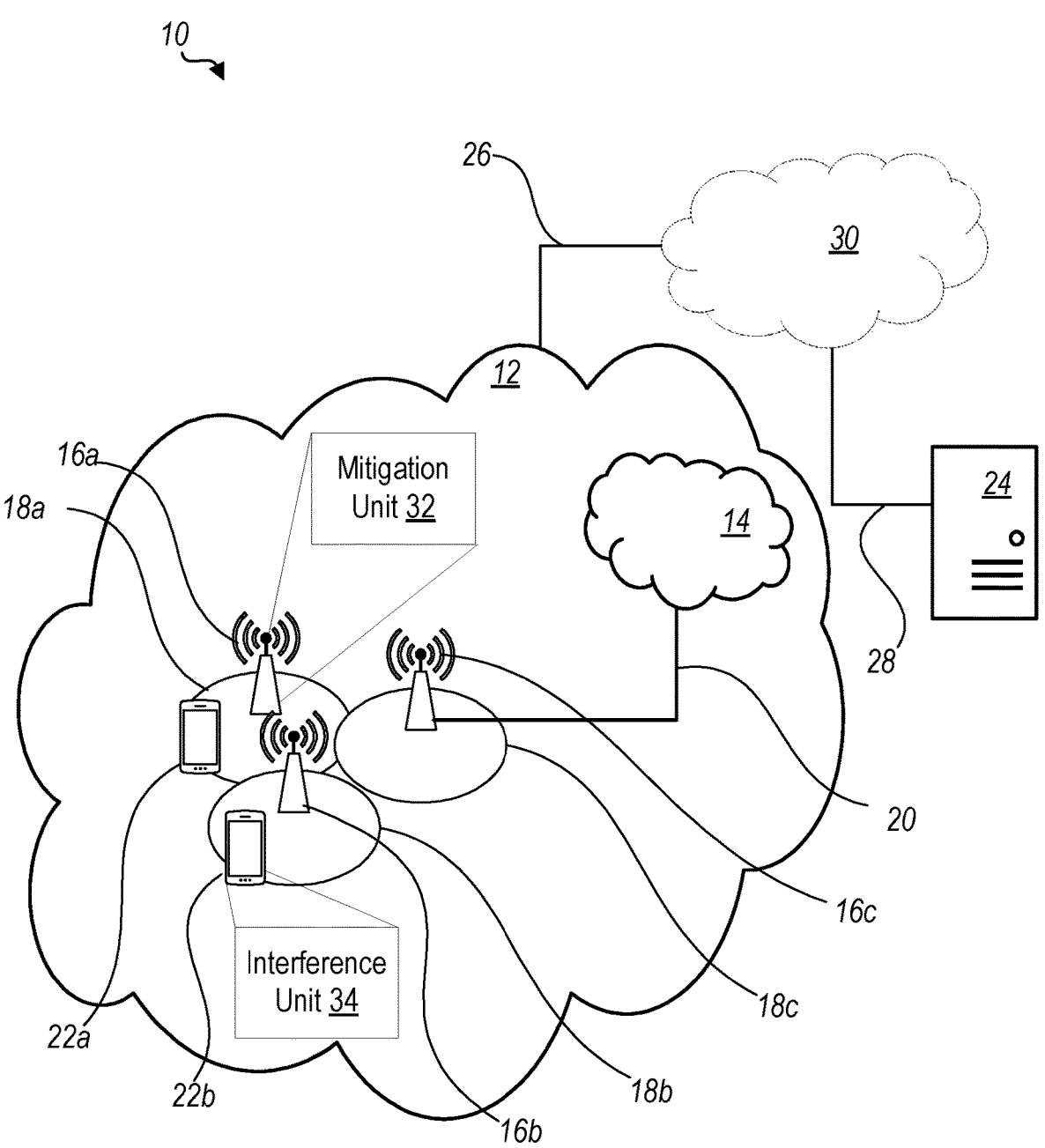
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14.

The access network 12 comprises a plurality of network nodes 16a, 16b, 16c (referred to collectively as network nodes 16), such as NB s, eNB s, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a mitigation unit 32 which is configured to determine at least one time resource in which at least a part of a first time division duplex (TDD) configuration used in a first network supported by a first network node does not correspond to a second TDD configuration used in a second network supported by a second network node; and apply at least one interference mitigation procedure during at least the at least one time resource.

A wireless device 22 is configured to include an interference unit 34 which is configured to determine at least one time resource in which at least a part of a first time division duplex (TDD) configuration used in a first network supported by a first network node does not correspond to a second TDD configuration used in a second network supported by a second network node; and apply at least one interference mitigation procedure during at least the at least one time resource.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include mitigation unit 32 configured to perform network node methods discussed herein, such as the methods discussed with reference to FIG. 8 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an interference unit 34 configured to perform WD methods discussed herein, such as the methods discussed with reference to FIG. 9 as well as other figures.

Figure 3:
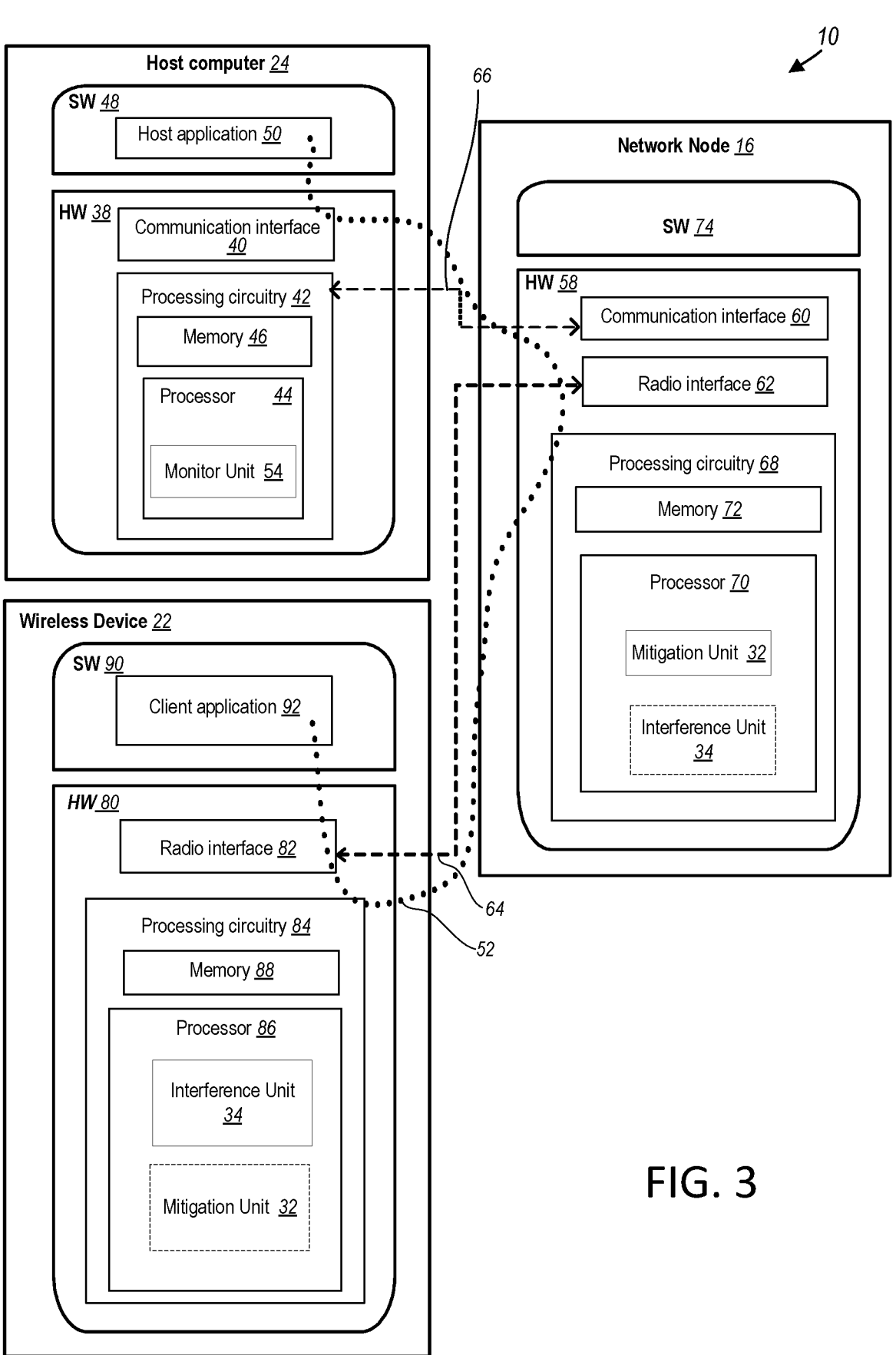
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as mitigation unit 32, and interference unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
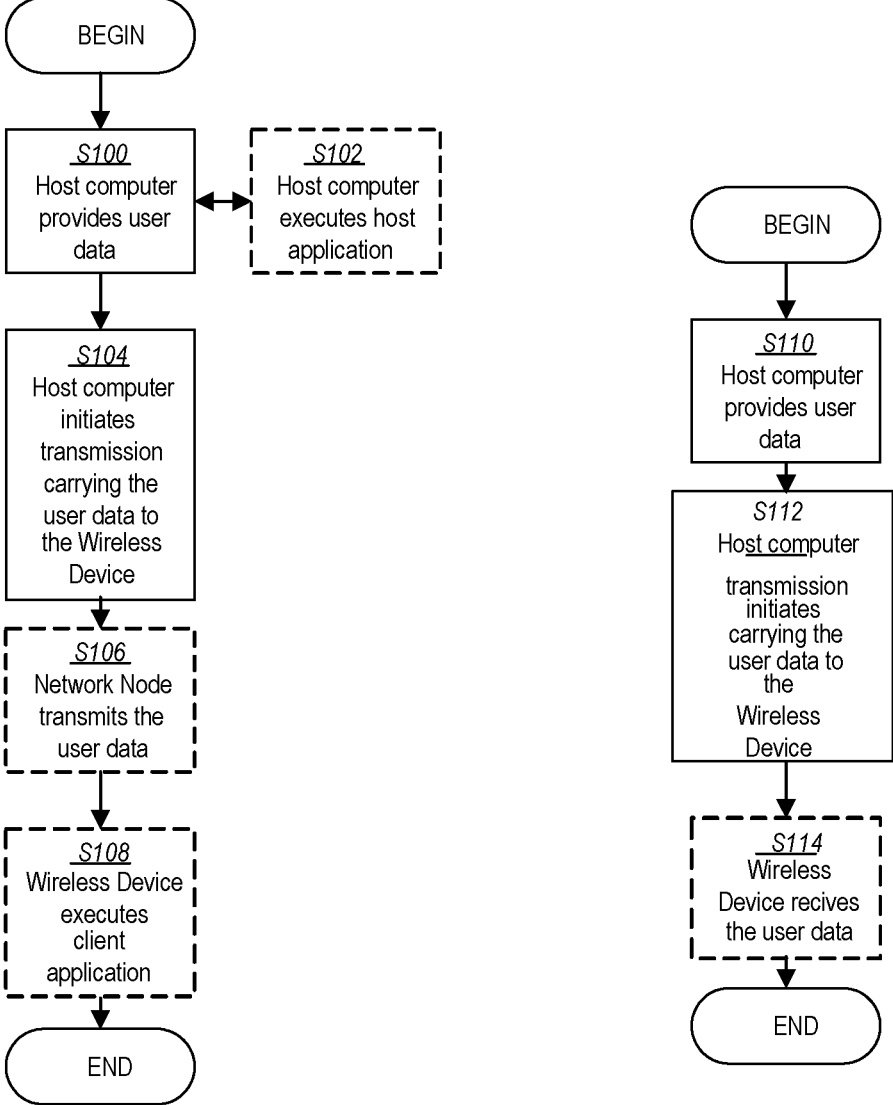
FIG. 4 is a flowchart illustrating exemplary methods implemented in a communication system including a host computer, a network node and a wireless device for executing a client application at a wireless device according to some embodiments of the present disclosure.
FIG. 5 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
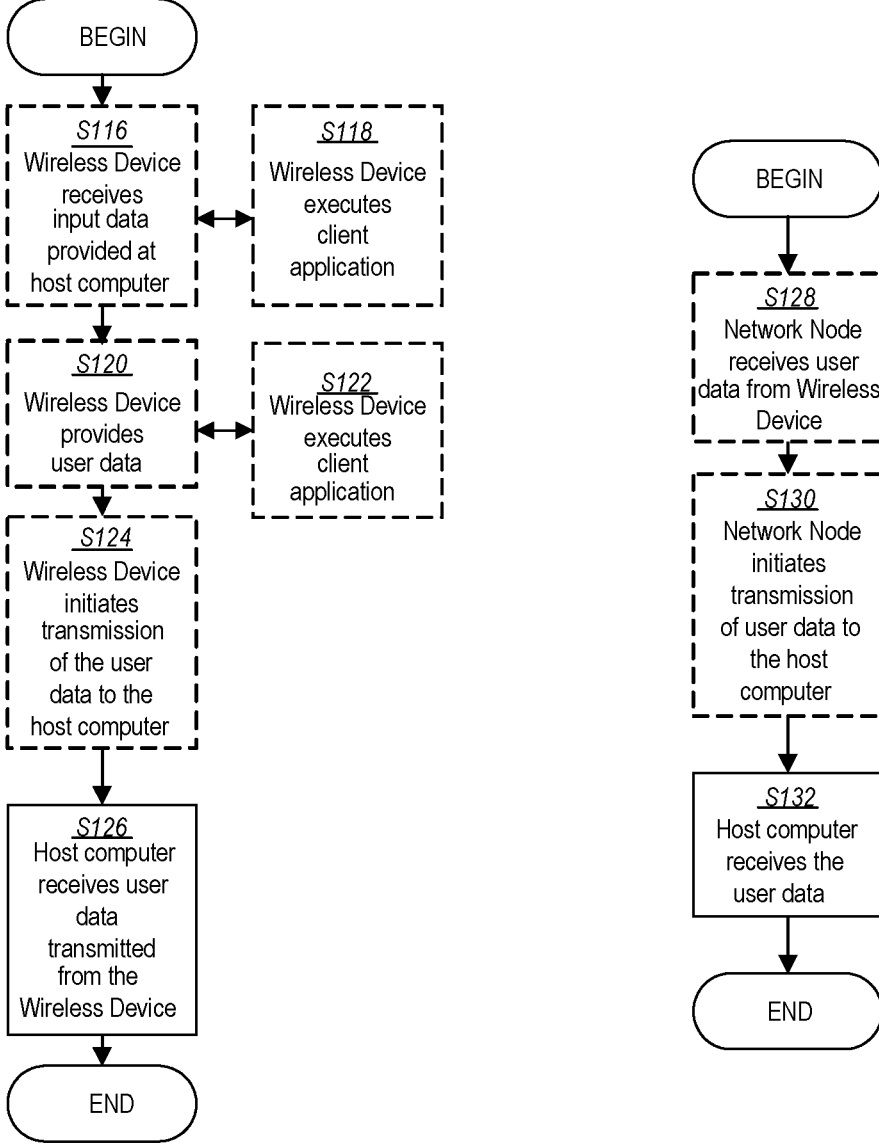
FIG. 6 is a flowchart illustrating exemplary methods implemented in a communication system including a host computer, a network node and a wireless device for receiving user data from the wireless device at a host computer according to some embodiments of the present disclosure.
FIG. 7 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 8 is a flowchart of an exemplary process in a network node 16 according to some embodiments of the present disclosure. One or more Blocks and/or functions and/or methods performed by the network node 16 may be performed by one or more elements of network node 16 such as by mitigation unit 32 in processing circuitry 68, processor 70, radio interface 62, communication interface 60, etc. according to the example method. The example method includes determining (Block S134), such as via mitigation unit 32, processing circuitry 68, processor 70, communication interface 60 and/or radio interface 62, at least one time resource in which at least a part of a first time division duplex (TDD) configuration used in a first network supported by the network node does not correspond to a second TDD configuration used in a second network supported by a second wireless node. The method includes applying (Block S136), such as via mitigation unit 32, processing circuitry 68, processor 70, communication interface 60 and/or radio interface 62, at least one interference mitigation procedure during at least the at least one time resource.

In some embodiments, the network node and the second wireless node are one of co-located and adjacent to one another. In some embodiments, determining comprises determining at least one time resource in which a communication direction within the first TDD configuration corresponding to the first network is not a same as a communication direction within the second TDD configuration corresponding to the second network. In some embodiments, the at least one interference mitigation procedure includes at least one of boosting a transmit, such as via mitigation unit 32, processing circuitry 68, processor 70, communication interface 60 and/or radio interface 62, power of signaling within at least one of the first and second network, adding, such as via mitigation unit 32, processing circuitry 68, processor 70, communication interface 60 and/or radio interface 62, at least one transmit receive point (TRP) node to a coordinated multi-point (CoMP) set, beamforming, such as via mitigation unit 32, processing circuitry 68, processor 70, communication interface 60 and/or radio interface 62, in a direction of an interfering signal, null-steering, such as via mitigation unit 32, processing circuitry 68, processor 70, communication interface 60 and/or radio interface 62, in a direction of an interfering signal, synchronizing the first and second TDD configurations, using, such as via mitigation unit 32, processing circuitry 68, processor 70, communication interface 60 and/or radio interface 62, at least one of a mobile relay and an antenna metasurface to transmit signaling.

Figure 9:
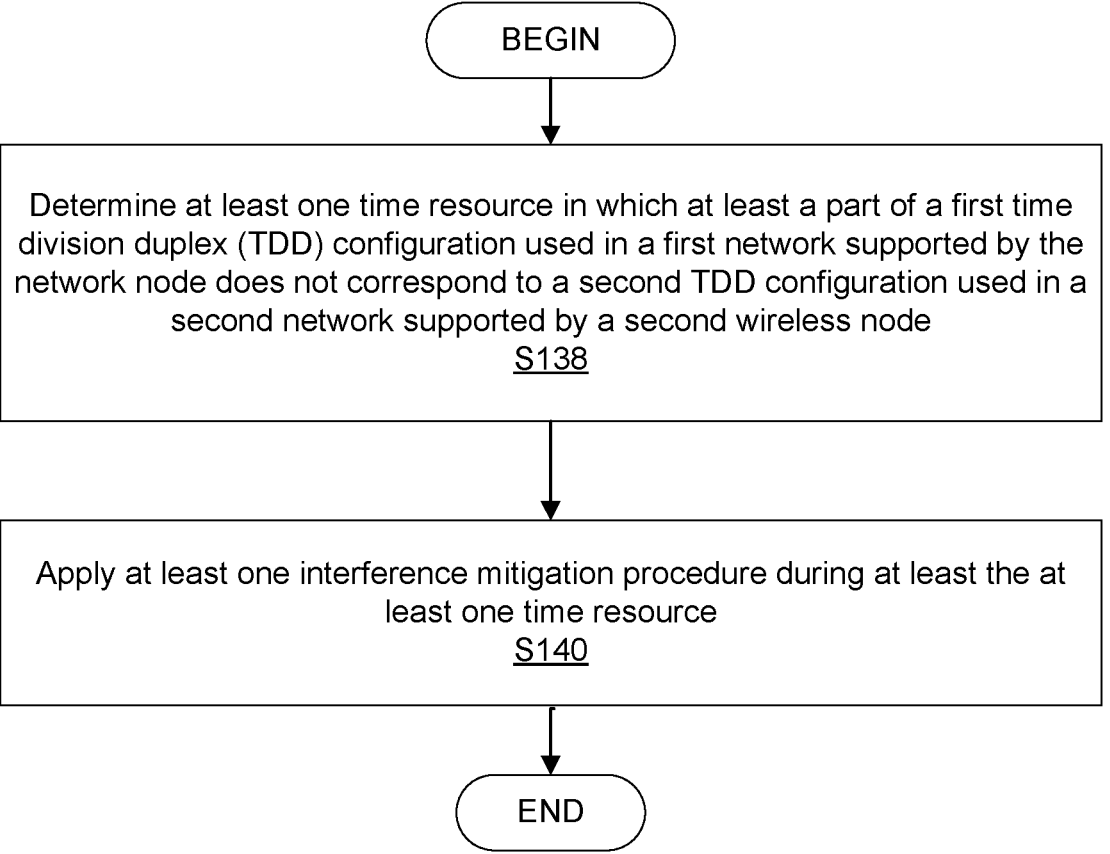
FIG. 9 is a flowchart of an exemplary process in a wireless device according to some embodiments of the present disclosure.

FIG. 9 is a flowchart of an exemplary process in a wireless device 22 according to some embodiments of the present disclosure. One or more Blocks and/or functions and/or methods performed by WD 22 may be performed by one or more elements of WD 22 such as by interference unit 34 in processing circuitry 84, processor 86, radio interface 82, etc. The example method includes determining (Block S138), such as via interference unit 34, processing circuitry 84, processor 86 and/or radio interface 82, at least one time resource in which at least a part of a first time division duplex (TDD) configuration used in a first network supported by a network node does not correspond to a second TDD configuration used in a second network supported by a second wireless node. The method includes applying (Block S140), such as via interference unit 34, processing circuitry 84, processor 86 and/or radio interface 82, at least one interference mitigation procedure during at least the at least one time resource.

In some embodiments, the network node and the second wireless node are one of co-located and adjacent to one another. In some embodiments, determining comprises determining, such as via interference unit 34, processing circuitry 84, processor 86 and/or radio interface 82, at least one time resource in which a communication direction within the first TDD configuration corresponding to the first network is not the same as a communication direction within the second TDD configuration corresponding to the second network. In some embodiments, the at least one interference mitigation procedure includes at least one of boosting, such as via interference unit 34, processing circuitry 84, processor 86 and/or radio interface 82, a transmit power of signaling within at least one of the first and second network, adding, such as via interference unit 34, processing circuitry 84, processor 86 and/or radio interface 82, at least one transmit receive point (TRP) node to a coordinated multi-point (CoMP) set, beamforming, such as via interference unit 34, processing circuitry 84, processor 86 and/or radio interface 82, in a direction of an wanted or desired signal, null-steering, such as via interference unit 34, processing circuitry 84, processor 86 and/or radio interface 82, in a direction of an interfering signal, synchronizing, such as via interference unit 34, processing circuitry 84, processor 86 and/or radio interface 82, the first and second TDD configurations, using, such as via interference unit 34, processing circuitry 84, processor 86 and/or radio interface 82, at least one of a mobile relay and an antenna metasurface to transmit signaling.

Figure 10:
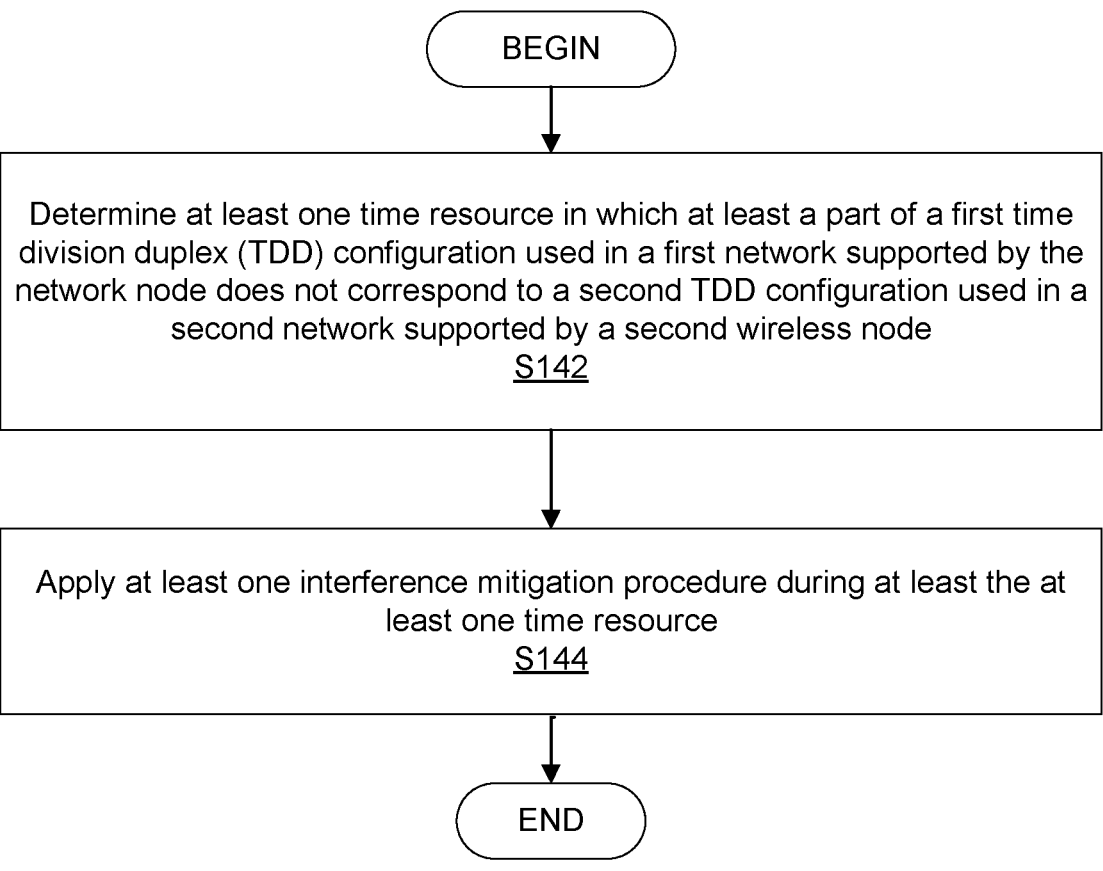
FIG. 10 is a flowchart of an exemplary process in a wireless node (e.g., network node, WD) according to some embodiments of the present disclosure.

FIG. 10 is a flowchart of an exemplary process in a wireless node (e.g., wireless device 22, network node (NN) 16) according to some embodiments of the present disclosure. One or more Blocks and/or functions and/or methods performed by the wireless node (e.g., WD 22, NN16) may be performed by one or more elements of the wireless node such as by interference unit 34 in processing circuitry 84, processor 86, radio interface 82, etc. in WD 22 and/or mitigation unit 32 in processing circuitry 68, processor 70, radio interface 62, communication interface 60, etc. in NN

16. The example method includes determining (Block S142), such as via interference unit 34, processing circuitry 84, processor 86, radio interface 82, mitigation unit 32, processing circuitry 68, processor 70, radio interface 62 and/or communication interface 60, determining at least one time resource in which at least a part of a first time division duplex, TDD, configuration used in a first network supported by a first network node does not correspond to at least a part of a second TDD configuration used in a second network supported by a second network node. The method includes applying (Block S144), such as via interference unit 34, processing circuitry 84, processor 86, radio interface 82, mitigation unit 32, processing circuitry 68, processor 70, radio interface 62 and/or communication interface 60, at least one interference mitigation procedure during at least the at least one time resource.

In some embodiments, determining the at least one time resource in which at least the part of the first TDD configuration used in the first network supported by the first network node does not correspond to the second TDD configuration used in the second network supported by the second network node comprises: determining, such as via interference unit 34, processing circuitry 84, processor 86, radio interface 82, mitigation unit 32, processing circuitry 68, processor 70, radio interface 62 and/or communication interface 60, the at least one time resource in which a communication direction within the first TDD configuration corresponding to the first network is not a same as a communication direction within the second TDD configuration corresponding to the second network.

In some embodiments, determining includes detecting, such as via interference unit 34, processing circuitry 84, processor 86, radio interface 82, mitigation unit 32, processing circuitry 68, processor 70, radio interface 62 and/or communication interface 60, the at least one time resource in which the at least the part of the first TDD configuration used in the first network supported by the first network node does not correspond to at least a part of the second TDD configuration used in the second network supported by the second network node.

In some embodiments, determining includes monitoring, such as via interference unit 34, processing circuitry 84, processor 86, radio interface 82, mitigation unit 32, processing circuitry 68, processor 70, radio interface 62 and/or communication interface 60, subframes in the first TDD configuration over a measurement time interval to determine at least one of a timing and an uplink-downlink pattern of a signal, the signal being associated with the second TDD configuration.

In some embodiments, the method further includes measuring, such as via interference unit 34, processing circuitry 84, processor 86, radio interface 82, mitigation unit 32, processing circuitry 68, processor 70, radio interface 62 and/or communication interface 60, a signal quality of a signal; when the signal quality is below a predetermined threshold, determining a level of interference of the signal; and wherein determining the at least one time resource is performed, such as via interference unit 34, processing circuitry 84, processor 86, radio interface 82, mitigation unit 32, processing circuitry 68, processor 70, radio interface 62 and/or communication interface 60, as a result of the level of interference exceeding a predetermined threshold.

In some embodiments, the method further includes detecting, such as via interference unit 34, processing circuitry 84, processor 86, radio interface 82, mitigation unit 32, processing circuitry 68, processor 70, radio interface 62 and/or communication interface 60, an angle of arrival, AoA, of an interfering signal; and wherein applying the at least one interference mitigation procedure includes using, such as via interference unit 34, processing circuitry 84, processor 86, radio interface 82, mitigation unit 32, processing circuitry 68, processor 70, radio interface 62 and/or communication interface 60, the AoA to apply the at least one interference mitigation procedure to mitigate the interfering signal during the at least one time resource.

In some embodiments, the at least one time resource comprises at least one subframe within at least one of the first TDD configuration and the second TDD configuration. In some embodiments, applying the at least one interference mitigation procedure includes boosting, such as via interference unit 34, processing circuitry 84, processor 86, radio interface 82, mitigation unit 32, processing circuitry 68, processor 70, radio interface 62 and/or communication interface 60, a transmit power of signaling within at least one of the first and second network during the determined at least one time resource.

In some embodiments, applying the at least one interference mitigation procedure includes adding, such as via interference unit 34, processing circuitry 84, processor 86, radio interface 82, mitigation unit 32, processing circuitry 68, processor 70, radio interface 62 and/or communication interface 60, at least one transmit receive point, TRP, node to a coordinated multi-point, CoMP, set. In some embodiments, applying the at least one interference mitigation procedure includes beamforming, such as via interference unit 34, processing circuitry 84, processor 86, radio interface 82, mitigation unit 32, processing circuitry 68, processor 70, radio interface 62 and/or communication interface 60, in a direction of a desired signal during the determined at least one time resource, the desired signal being associated with the first network.

In some embodiments, applying the at least one interference mitigation procedure includes null-steering, such as via interference unit 34, processing circuitry 84, processor 86, radio interface 82, mitigation unit 32, processing circuitry 68, processor 70, radio interface 62 and/or communication interface 60, in a direction of an interfering signal during the determined at least one time resource, the interfering signal being associated with the second network. In some embodiments, the wireless node is one of the first network node and the second network node. In some embodiments, the wireless node is a user equipment communicating in one of the first network and the second network.

In some embodiments of this aspect, the method further includes using, such as via interference unit 34, processing circuitry 84, processor 86, radio interface 82, mitigation unit 32, processing circuitry 68, processor 70, radio interface 62 and/or communication interface 60, a reinforcement learning algorithm to select a combination of interference mitigation procedures to apply. In some embodiments of this aspect, the reinforcement learning algorithm is based at least in part on at least one of a measured performance metric, a presence of interference and a detected time division duplex, TDD, pattern. In some embodiments of this aspect, applying the at least one interference mitigation procedure during the at least the at least one time resource comprises causing, such as via interference unit 34, processing circuitry 84, processor 86, radio interface 82, mitigation unit 32, processing circuitry 68, processor 70, radio interface 62 and/or communication interface 60, at least one of attenuating an interfering signal, redirecting a desired signal and amplifying the desired signal via at least one active antenna meta-surface. In some embodiments of this aspect, applying the at least one interference mitigation procedure during the at least the at least one time resource comprises causing, such as via interference unit 34, processing circuitry 84, processor 86, radio interface 82, mitigation unit 32, processing circuitry 68, processor 70, radio interface 62 and/or communication interface 60, a re-transmission of a desired signal via at least one mobile relay.

Having described the general process flow of arrangements of the disclosure and having provided examples of hardware and software arrangements for implementing the processes and functions of the disclosure, the sections below provide details and examples of arrangements for interference robust adaptive Time Division Duplex (TDD) configuration with multiple Transmit Receive Points (multi-TRP), which may be implemented by the network node 16, wireless device 22 and/or host computer 24.

Embodiment 1

Figure 11:
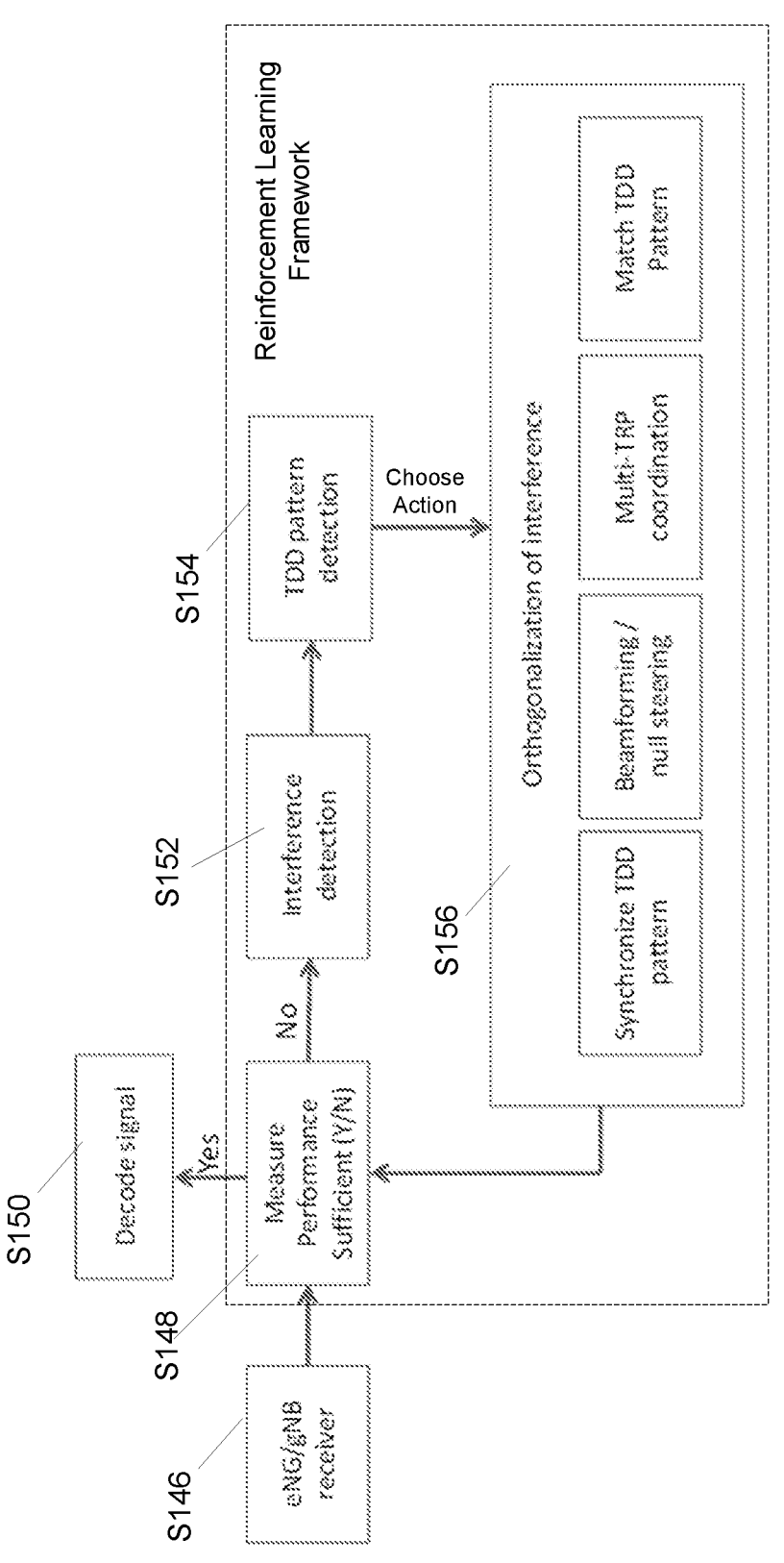
FIG. 11 illustrates an example TDD configuration interference mitigation process according to some embodiments of the present disclosure.

This embodiment may define a method to mitigate interference between collocated or proximate wireless nodes (e.g., TRPs, WDs 22, network nodes (NN) 16) in networks that employ differing TDD configurations of UL and DL transmission intervals. The steps of one example methodology are illustrated in FIG. 11 and are described in more detail below.

1. The first step, step S146, includes reception and demodulation of the received desired signal at the target wireless node (e.g., WD 22, NN 16), such as a network node 16 (e.g., eNB or gNB), and measurement of signal performance or quality metric Q. This metric can be based upon criteria such as the measured interference level $I_1$, reference signal received power (RSRP), reference signal received quality (RSRQ), signal-to-noise-plus-interference ratio (SINR) and signal-to-leakage-plus-noise ratio (SLNR) of the received uplink (UL) signal at the network node 16 or wireless node (e.g., WD 22).

2. The next step, step S148, may include determining whether the measurement performance is sufficient.

3. If yes, decode the signal in step S150. If no, detect interference in step S152. For example, if the measured signal quality Q is below a defined threshold (T1), quantify the level of interference detectable at the receiver. This can be achieved for example in Third Generation Partnership Project (3GPP) networks by employing a channel state information reference signal (CSI-RS) defined for interference measurement (IM). As part of this step of measuring the interfering signal, the serving network node 16 (e.g., gNB) may also detect the angle of arrival (AoA) of the interfering signal by exploiting beamforming or massive multiple-input multiple-output (MIMO) implementations.

4. If the level of interference $I_1$ exceeds a defined threshold (T2), the receiver (e.g., TRP, WD 22, NN 16) may invoke a TDD pattern detector of the interference in step S154.

5. Step S154 may include the receiver (e.g., TRP, WD 22, NN 16) monitoring all subframes within one or more frames—i.e., both UL and DL designated subframes of the configuration being employed by the target wireless network node 16 over a measurement interval of $T_{meas}$ and determine the timing and DL/UL TDD pattern of a possible interfering signal. One method of determining the pattern is to represent an uplink slot (or sub-frame) with a −1 and a downlink slot (or sub-frame) with a 1 before correlating the pattern thus obtained with a set of known patterns and determining the peak. An alternative method is to correlate the pattern with a similarly generated pattern corresponding to the network node 16 that the receiver (e.g., TRP, WD 22, NN 16) belongs to or the network node 16 that the receiver (e.g., TRP, WD 22, NN 16) is monitoring to verify that the pattern matches or does not.

6. If a TDD configuration pattern is detected consistent with the interference power above the threshold (T2) as detected in step S152, the region of common configuration and the conflicting unsynchronized configuration mismatch interval (CMI) (see FIG. 12), between the defined TDD configuration of the target wireless network node 16 (e.g., eNB/gNB) and the estimated interfering transmission may be captured. If a TDD CMI is detected (by e.g., TRP, WD 22, NN 16) in step S154, the next step may include, step S156, mitigating the interference through orthogonalization if possible, and if not, through minimization of the interference. The substeps in block S156 to mitigate the interference (which may be performed by e.g., TRP, WD 22, NN 16) include, but are not limited to the following. Note that all, some or just one of the substeps below may be employed as part of this embodiment.

a. Boost, such as by the wireless node (e.g., WD 22 and/or NN 16), the transmitted signal power (UL/uplink or DL/downlink). If the difference between the signal level S and the level of interference $I_1$ is less than a threshold T3, and or the quality metric Q is less than T1, boosting of the signal S may be employed to achieve a target level of signal quality such as SINR.

b. If the difference in power level between the desired signal S and the interference $I_1$ is such that boosting the power of the desired signal S does not result in sufficient mitigation of the interference, additional steps may be taken by the wireless node (e.g., WD 22 and/or NN 16) to mitigate the interference as detailed in the sub steps below.

i. Synchronize TDD pattern: If the detected TDD pattern of the interference matches the TDD pattern of the desired signal, the timing of the desired signal may be adjusted to align the transmission of the desired signal frame start with that of the interfering signal. Note that this step will potentially result in misalignment between transmissions from the wireless network node 16 under consideration and other wireless network nodes 16 and UE's 22 in the desired user's network. As such a control signal may be transmitted to the other wireless nodes (e.g., TRP, WD 22, NN 16) in the desired network (by for example an X2 interface or equivalent), informing them of the new timing reference point for the start of a frame. Based on this revised synchronization timing information, wireless nodes (e.g., TRPs, WDs 22, NNs 16) in the desired network may choose to re-align their transmissions to this new timing reference.

ii. Multi-TRP coordination: If the detected TDD pattern of the interference does not match the TDD pattern of the desired signal, and during the TDD CMI the interference $I_1$ is above a threshold T3, and a second TRP signal can be transmitted to the target receiver with a quality metric above a lower threshold T4, the second TRP may be assigned to serve the WD 22 in the event that the link to that TRP is of acceptable quality. If the link quality to the second TRP is not of sufficient quality to support the WD 22 by handover of the radio link, then the second TRP may be added in the network of the desired signal, such that during DL subframes of the desired signal during the CMI, the second TRP will also transmit the desired signal, enabling spatial diversity and/or CoMP for the desired users signal at the WD 22. At the receiving WD 22, the received signal from the two TRPs can be processed through known diversity processing approaches such as selection diversity, maximum ratio combining or joint processing.

Furthermore, for UL subframes during the CMI, the second TRP may act as a spatial diversity receiver for UL transmissions from the target WD 22. The received signal from the WD 22 at the serving wireless node (e.g., TRP, NN 16) and the second TRP can be processed through known diversity processing approaches such as selection diversity, maximum ratio combining or joint processing. In this context the serving wireless node (e.g., TRP, NN 16) and the serving TRP can be considered a CoMP set. Given that the TRPs (i.e., the serving wireless node and the second TRP) may be physically separate wireless nodes, the second TRP may transmit the received signal to the serving wireless node over a 3GPP standard interface such as for example an X2 interface, or a proprietary interface, at which the diversity or joint processing will be implemented. In some cases, the second TRP may choose to send likelihood ratios of the received symbols after demodulation that can be used as soft information that will augment the process of demodulation and decoding of the information at the first TRP. It should be realized that the roles of the first and second TRPs can be switched.

Figure 13:
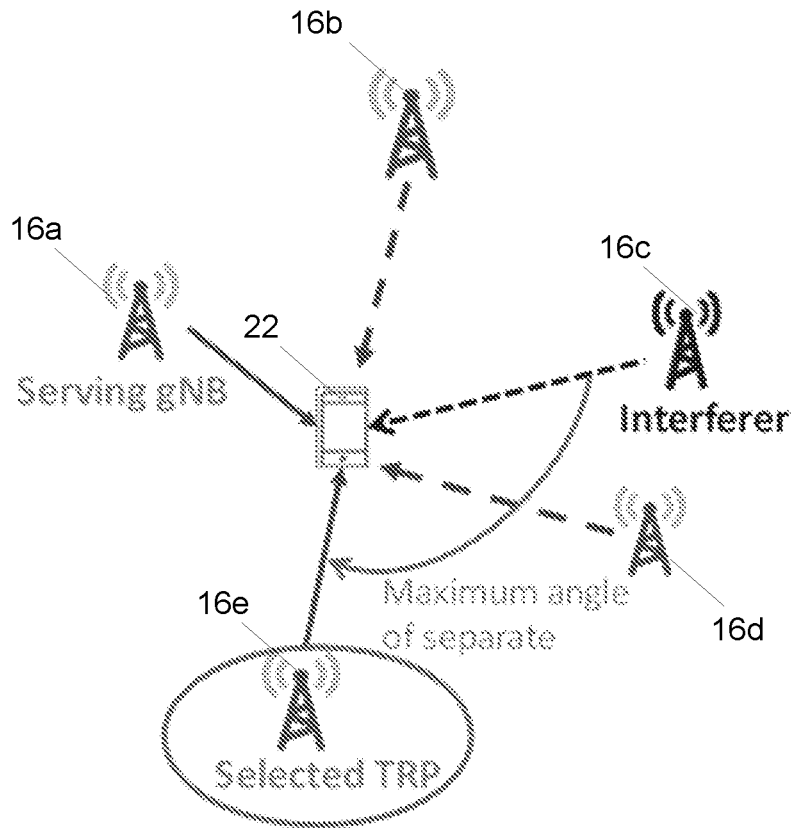
FIG. 13 illustrates an example Selection of TRP with maximum angle of separation (max) from the Interferer eNB/gNB according to some embodiments of the present disclosure.

Note that the selection and scheduling of the second TRP can be managed by the serving network node 16 (e.g., gNB) and supported through signaling for example via an X2 interface between the serving network node 16 (e.g., gNB) and the second TRP gNB supporting the serving gNB. The selection of the second TRP can be optimized by exploiting the measured angle-of-arrival (AoA) of the interfering signal in the step above, such that the second TRP is selected to maximize the direction angle between it and the receiving wireless node as measured against the direction angle of the interfering signal (see FIG. 13 for example). This may maximize the potential to steer a spatial null at the receiving node in the direction of the interferer, while still maximizing the potential for spatial beamforming gain in the direction of the desired signal.

As part of this method, additional numbers of one or more TRPs may be added to the CoMP set to transmit/receive the desired signal to/from the target WD 22. The scheduling and processing steps may be considered extensions of the methods described above.

iii. Beamforming/null steering: Alternatively, in place of, or in addition to (i) and (ii) above, the wireless network node 16 transmitting/receiving the desired transmission may beam steer a spatial null in the direction of the interfering signal $I_1$ during the CMI to reduce the power level of the received interference $I_1$.

iv. Alternatively, or additionally, rather than beam steering a null in the direction of the interfering signal when the detected TDD pattern of the interference does not match the TDD pattern of the desired signal (i.e., during the CMI), the wireless node (e.g., TRP, WD 22, NN 16) receiving the desired transmission may steer a beam in the direction of the desired signal S, to improve the received power of the signal S, and hence the overall SINR.

v. Alternatively, or additionally, in place of sub steps (iii) and (iv) above, during the CMI, the wireless node (e.g., TRP, WD 22, NN 16) receiving the desired transmission may both beam steer a spatial null in the direction of the interfering signal $I_1$, and simultaneously steer a beam in the direction of the desired signal S, to improve the received power of the signal S, and hence the overall SINR.

Alternatively, in addition to the method of step ii above, during the TDD configuration mismatch interval (CMI), see FIG. 12, both the serving network node 16 (e.g., gNB) and the second TRP may beam steer a spatial null in the direction of the interfering signal $I_1$ to reduce the power level of the received interference $I_1$. As part of this method, a third or more TRPs may be added to transmit the desired signal to the target WD 22 if the third or more TRPs received signal at the WD 22 is above a threshold, T4. The scheduling and processing steps may be considered extensions of the methods described above.

Lastly, in the case of joint reception, the entire set of TRPs may be configured to jointly improve the composite desired signal energy at the receiver, while simultaneously suppressing interference (e.g. by steering nulls) towards one or more interfering nodes with mismatched TDD patterns.

Embodiment 2: ML and/or Cloud Based Implementation

Embodiment 2 includes an instantiation of the functionality of embodiment 1 for which the optimization choices by the wireless node (e.g., WD 22 and/or NN 16) are based on reinforcement learning algorithms. Known reward, state, action based reinforcement learning frameworks and algorithms such as Q learning can be employed to dynamically optimize the chosen solution. The total reward Q(s,a) at a given state s, for action a, is defined by equation (1) below, in which r(s,a) is the immediate reward from action a in state s, and Q(s',a) is the Q value for the previous states'. Formally this can be expressed as:

$$Q(s,a)=r(s,a)+\gamma\max Q(s',a) \qquad (1),$$

or alternatively as a discrete time based update as defined in equation (2) below with St being the state at time t, and $A_t$ being the action at time t. In both equations, $\gamma$ is a tuneable hyperparameter chosen to ensure convergence of the process:

$$Q(S_t,A_t) \leftarrow Q(S_t,A_t)+\alpha[R_{t+1}+\gamma\max Q(S_{t+1},a)-Q(S_t,A_t)] \qquad (2).$$

For the problem of adaptive TDD configuration with multi-TRP, the state of the reinforcement learning solution can be based on for example a combination of the measured performance metric, the presence of interference and the detected TDD pattern. The chosen action can be one or more of the interference orthogonalization steps defined in Embodiment 1, for example:

synchronizing the TDD pattern, beam or null steering, multi-TRP selection, activation and coordination, and/or matching of TDD patterns.

Based on the chosen action the reinforcement algorithm reward can be defined in terms of the chosen quality metric (e.g., RSRP, RSRQ, SINR and SLNR) of the received UL signal at the network node 16 or wireless node). For example, in some embodiments, the framework depicted in FIG. 11 may include the proposed reinforcement learning algorithm.

Figure 14:
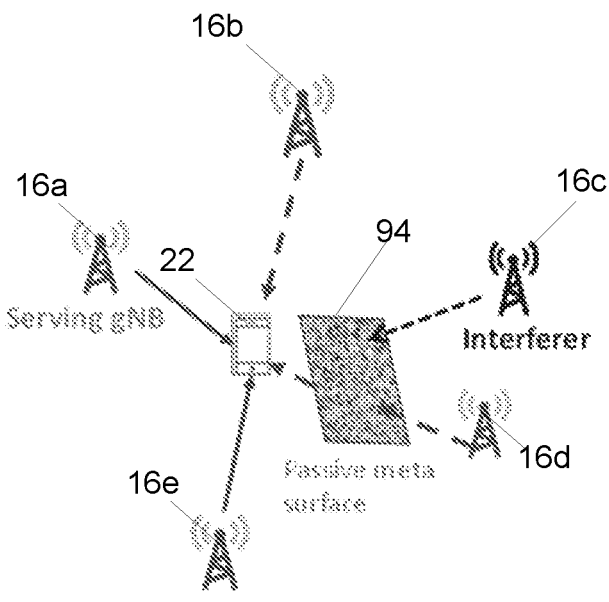
FIG. 14 illustrates an example use of passive antenna metasurfaces according to some embodiments of the present disclosure.

Embodiment 3: Use of Antenna Metasurfaces to Exploit Multipath Transmissions and Attenuate Interferers Referring to FIG. 14, embodiment 3 may be considered an extension of embodiment 1 and includes employing antenna metasurfaces 94 at or in the proximity of one or more of the TRPs (e.g., network node 16) of embodiment 1. Such antenna metasurfaces 94 can serve to attenuate and/or redirect the interfering signal, or to amplify and redirect desired signal. For example, passive antenna metasurfaces 94 may be employed that attenuate the frequency band of an interfering signal, but allow the frequency band of the desired signal to pass through. Such surfaces 94 may be employed to shield the receiver of a desired wireless node (e.g., TRP, WD 22, NN 16), as illustrated in FIG. 14. For example, such surfaces 94 could be installed on the windows or wall of buildings to shield wireless nodes with a given building.

Figure 15:
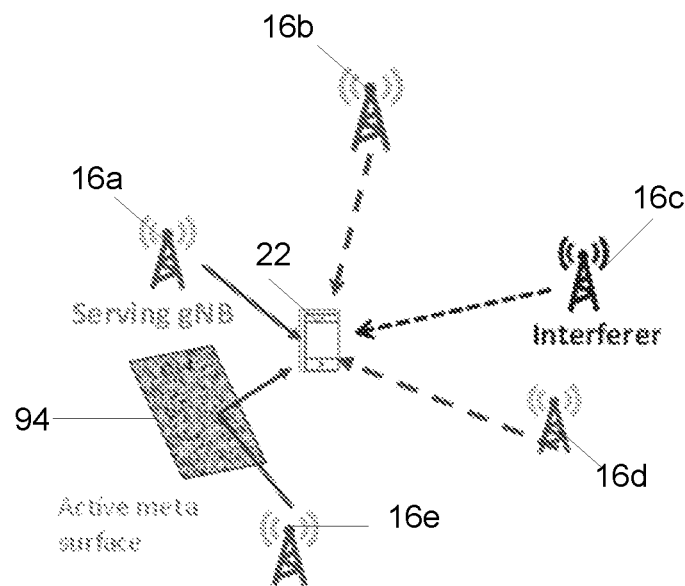
FIG. 15 illustrates an example use of active antenna metasurfaces according to some embodiments of the present disclosure.

Active antenna metasurfaces may also be employed that can redirect desired signals and attenuate interfering signals. Such surfaces 94 could be employed for example to reflect a multipath of the desired signal in the direction of the intended receiving wireless node (e.g., TRP, WD 22, NN 16) as illustrated in FIG. 15, enhancing the received power of the desired signal.

Embodiment 4: Use Mobile Relays to Enhance Transmissions

Figure 16:
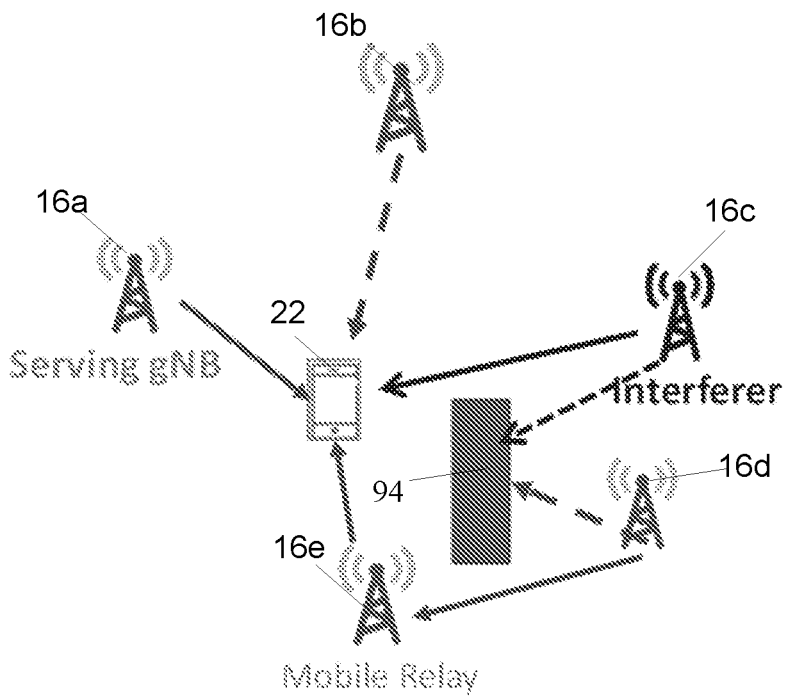
FIG. 16 illustrates an example of use of mobile relay TRPs according to some embodiments of the present disclosure.

Embodiment 4 may be considered an extension of embodiment 1 and includes instantiating one or more of the TRPs of embodiment 1 as mobile relays (e.g., NN 16e). Such mobile relays (e.g., NN 16e) can be deployed in proximity of the desired receiving wireless node (e.g., TRP, WD 22, NN 16), in locations with a low level of interfering signal, but also having a high value of the quality metric of the desired signal. The mobile relay (e.g., NN 16e) TRP may serve to retransmit the high quality desired signal to the target receiving wireless node (e.g., TRP, WD 22, NN 16) in order to improve the overall quality of the received signal. FIG. 16 illustrates an example of such a scenario for which transmission from a TRP (e.g., NN 16c) to the desired wireless node receiver (e.g., WD 22) is physically blocked, but can be re-transmitted through a mobile relay (e.g., NN 16e) to the desired wireless node (e.g., WD 22). Note that in this example the relay (e.g., NN 16*e*) is located such that the interfering signal is blocked in the direction of the relay (e.g., NN 16*e*).

Some embodiments of the present disclosure provide arrangements to mitigate co-channel and adjacent channel interference between co-located or proximate TDD networks that are unsynchronized in time and/or unsynchronized in the TDD UL/DL configuration pattern. Some embodiments of the present disclosure may achieve significant interference mitigation without the need for expensive additional filtering or spectrally inefficient use of guard bands. Furthermore, some embodiments of the present disclosure are based on local measurements at a given network node or wireless node, and may not require significant additional signaling overhead to implement. Some embodiments of the present disclosure may adaptively add additional transmit receive points and/or beamforming to a target transmission in the presence of co-located mismatched TDD transmissions. The adaptive steps are instantiated on the mismatched subframes of the TDD configuration, ensuring efficiency of resource allocations during subframes TDD subframes that are not mismatched.

Some embodiments may include one or more of the following:

Embodiment A1. A network node configured to communicate with a wireless device (WD), the network node configured to, and/or comprising a radio interface and/or comprising processing circuitry configured to:

determine at least one time resource in which at least a part of a first time division duplex (TDD) configuration used in a first network supported by the network node does not correspond to a second TDD configuration used in a second network supported by a second wireless node; and apply at least one interference mitigation procedure during at least the at least one time resource.

Embodiment A2. The network node of Embodiment A1, wherein the network node and the second wireless node are one of co-located and adjacent to one another.

Embodiment A3. The network node of any one of Embodiments A1 and A2, wherein the network node and/or the radio interface and/or the processing circuitry is configured to cause the network node to determine by being configured to cause the network node to:

determine at least one time resource in which a communication direction within the first TDD configuration corresponding to the first network is not a same as a communication direction within the second TDD configuration corresponding to the second network.

Embodiment A4. The network node of any one of Embodiments A1-A3, wherein the at least one interference mitigation procedure includes at least one of boosting a transmit power of signaling within at least one of the first and second network, adding at least one transmit receive point (TRP) node to a coordinated multi-point (CoMP) set, beamforming in a direction of an interfering signal, null-steering in a direction of an interfering signal, synchronizing the first and second TDD configurations, using at least one of a mobile relay and an antenna metasurface to transmit signaling.

Embodiment B1. A method implemented in a network node, the method comprising:

determining at least one time resource in which at least a part of a first time division duplex (TDD) configuration used in a first network supported by the network node does not correspond to a second TDD configuration used in a second network supported by a second wireless node; and applying at least one interference mitigation procedure during at least the at least one time resource.

Embodiment B2. The method of Embodiment B1, wherein the network node and the second wireless node are one of co-located and adjacent to one another.

Embodiment B3. The method of any one of Embodiments B1 and B2, wherein the determining comprises:

determining at least one time resource in which a communication direction within the first TDD configuration corresponding to the first network is not a same as a communication direction within the second TDD configuration corresponding to the second network.

Embodiment B4. The method of any one of Embodiments B1-B3, wherein the at least one interference mitigation procedure includes at least one of boosting a transmit power of signaling within at least one of the first and second network, adding at least one transmit receive point (TRP) node to a coordinated multi-point (CoMP) set, beamforming in a direction of an interfering signal, null-steering in a direction of an interfering signal, synchronizing the first and second TDD configurations, using at least one of a mobile relay and an antenna metasurface to transmit signaling.

Embodiment C1. A wireless device (WD) configured to communicate with a network node, the WD configured to, and/or comprising a radio interface and/or processing circuitry configured to:

determine at least one time resource in which at least a part of a first time division duplex (TDD) configuration used in a first network supported by the network node does not correspond to a second TDD configuration used in a second network supported by a second wireless node; and apply at least one interference mitigation procedure during at least the at least one time resource.

Embodiment C2. The wireless device of Embodiment C1, wherein the network node and the second wireless node are one of co-located and adjacent to one another.

Embodiment C3. The wireless device of any one of Embodiments C1 and C2, wherein the network node and/or the radio interface and/or the processing circuitry is configured to cause the network node to determine by being configured to cause the network node to:

determine at least one time resource in which a communication direction within the first TDD configuration corresponding to the first network is not a same as a communication direction within the second TDD configuration corresponding to the second network.

Embodiment C4. The wireless device of any one of Embodiments C1-C3, wherein the at least one interference mitigation procedure includes at least one of boosting a transmit power of signaling within at least one of the first and second network, adding at least one transmit receive point (TRP) node to a coordinated multi-point (CoMP) set, beamforming in a direction of an interfering signal, null-steering in a direction of an interfering signal, synchronizing the first and second TDD configurations, using at least one of a mobile relay and an antenna metasurface to transmit signaling.

Embodiment D1. A method implemented in a wireless device, the method comprising:

determining at least one time resource in which at least a part of a first time division duplex (TDD) configuration used in a first network supported by a network node does not correspond to a second TDD configuration used in a second network supported by a second wireless node; and applying at least one interference mitigation procedure during at least the at least one time resource.

Embodiment D2. The method of Embodiment D1, wherein the network node and the second wireless node are one of co-located and adjacent to one another.

Embodiment D3. The method of any one of Embodiments D1 and D2, wherein the determining comprises:

determining at least one time resource in which a communication direction within the first TDD configuration corresponding to the first network is not a same as a communication direction within the second TDD configuration corresponding to the second network.

Embodiment D4. The method of any one of Embodiments D1-D3, wherein the at least one interference mitigation procedure includes at least one of boosting a transmit power of signaling within at least one of the first and second network, adding at least one transmit receive point (TRP) node to a coordinated multi-point (CoMP) set, beamforming in a direction of an interfering signal, null-steering in a direction of an interfering signal, synchronizing the first and second TDD configurations, using at least one of a mobile relay and an antenna metasurface to transmit signaling.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| AoA | Angle of Arrival |
| CMI | Configuration Mismatch Interval |
| DL | Downlink |
| MIMO | Multiple Input Multiple Output |
| RSRP | Reference Signal Receive Power |
| RSRQ | Reference Signal Receive Quality |
| SINR | Signal-to-Interference plus Noise Ration |
| SLNR | Signal-to-Leakage plus Noise Ratio |
| TDD | Time Division Duplex |
| TRP | Transmit Receive Point |
| UE | User Equipment |
| UL | Up-link |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless node, the method comprising:

determining at least one time resource in which at least a part of a first time division duplex, TDD, configuration used in a first network supported by a first network node does not correspond to a second TDD configuration used in a second network supported by a second network node;

using a reinforcement learning algorithm based on a detected time division duplex (TDD) pattern to select a combination of interference mitigation procedures to apply; and applying the combination of interference mitigation procedures during at least the at least one time resource.

2. The method of claim 1, wherein determining the at least one time resource in which the at least the part of the first TDD configuration used in the first network supported by the first network node does not correspond to the second TDD configuration used in the second network supported by the second network node comprises:

determining the at least one time resource in which a communication direction within the first TDD configuration corresponding to the first network is not a same as a communication direction within the second TDD configuration corresponding to the second network.

3. The method of claim 1, wherein determining comprises detecting the at least one time resource in which the at least the part of the first TDD configuration used in the first network supported by the first network node does not correspond to the second TDD configuration used in the second network supported by the second network node.

4. The method of claim 1, wherein determining comprises monitoring subframes in the first TDD configuration over a measurement time interval to determine at least one of a timing and an uplink-downlink pattern of a signal, the signal being associated with the second TDD configuration.

5. The method of claim 1, further comprising:

measuring a signal quality of a signal;

when the signal quality is below a predetermined threshold, determining a level of interference of the signal; and wherein determining the at least one time resource is performed as a result of the level of interference exceeding a predetermined threshold.

6. The method of claim 1, further comprising:

detecting an angle of arrival, AoA, of an interfering signal; and wherein applying the at least one interference mitigation procedure comprises using the AoA to apply the at least one interference mitigation procedure to mitigate the interfering signal during the at least one time resource.

7. The method of claim 1, wherein the at least one time resource comprises at least one subframe within at least one of the first TDD configuration and the second TDD configuration.

8. The method of claim 1, wherein applying the at least one interference mitigation procedure comprises boosting a transmit power of signaling within at least one of the first and second networks during the determined at least one time resource.

9. The method of claim 1, wherein applying the at least one interference mitigation procedure comprises adding at least one transmit receive point, TRP, node to a coordinated multi-point, CoMP, set.

10. The method of claim 1, wherein applying the at least one interference mitigation procedure comprises beamforming in a direction of a desired signal during the determined at least one time resource, the desired signal being associated with the first network.

11. The method of claim 1, wherein applying the at least one interference mitigation procedure comprises null-steering in a direction of an interfering signal during the determined at least one time resource, the interfering signal being associated with the second network.

12. The method of claim 1, wherein the reinforcement learning algorithm is based at least in part on at least one of a measured performance metric and a presence of interference.

13. The method of claim 1, wherein applying the at least one interference mitigation procedure during the at least the at least one time resource comprises causing at least one of attenuating an interfering signal, redirecting a desired signal and amplifying the desired signal via at least one active antenna metasurface.

14. The method of claim 1, wherein applying the at least one interference mitigation procedure during the at least the at least one time resource comprises causing a re-transmission of a desired signal via at least one mobile relay.

15. The method of claim 1, wherein the wireless node is one of the first network node and the second network node.

16. The method of claim 1, wherein the wireless node is a user equipment communicating in one of the first network and the second network.

17. A wireless node, the wireless node comprising processing circuitry, the processing circuitry configured to cause the wireless node to:

determine at least one time resource in which at least a part of a first time division duplex, TDD, configuration used in a first network supported by a first network node does not correspond to a second TDD configuration used in a second network supported by a second network node;

use a reinforcement learning algorithm based on a detected time division duplex (TDD) pattern to select a combination of interference mitigation procedures to apply; and apply the combination of interference mitigation procedures during at least the at least one time resource.

18. The wireless node of claim 17, wherein the processing circuitry is configured to cause the wireless node to determine by being configured to cause the wireless node to:

determine the at least one time resource in which a communication direction within the first TDD configuration corresponding to the first network is not a same as a communication direction within the second TDD configuration corresponding to the second network.

19. The wireless node of claim 17, wherein the processing circuitry is configured to cause the wireless node to determine by being configured to cause the wireless node to detect the at least one time resource in which the at least the part of the first TDD configuration used in the first network supported by the first network node does not correspond to the second TDD configuration used in the second network supported by the second network node.

20. The wireless node of claim 17, wherein the processing circuitry is configured to cause the wireless node to determine by being configured to monitor subframes in the first TDD configuration over a measurement time interval to determine at least one of a timing and an uplink-downlink pattern of a signal, the signal being associated with the second TDD configuration.

21. The wireless node of claim 17, wherein the processing circuitry is configured to cause the wireless node to:

measure a signal quality of a signal;

when the signal quality is below a predetermined threshold, determine a level of interference of the signal; and determine the at least one time resource as a result of the level of interference exceeding a predetermined threshold.

22. The wireless node of claim 17, wherein the processing circuitry is further configured to cause the wireless node to:

detect an angle of arrival, AoA, of an interfering signal; and apply the at least one interference mitigation procedure by being configured to use the AoA to apply the at least one interference mitigation procedure to mitigate the interfering signal during the at least one time resource.

23. The wireless node of claim 17, wherein the at least one time resource comprises at least one subframe within at least one of the first TDD configuration and the second TDD configuration.

24. The wireless node of claim 17, wherein the processing circuitry is configured to cause the wireless node to apply the at least one interference mitigation procedure by being configured to cause the wireless node to boost a transmit power of signaling within at least one of the first and second network during the determined at least one time resource.

25. The wireless node of claim 17, wherein the processing circuitry is configured to cause the wireless node to apply the at least one interference mitigation procedure by being configured to cause the wireless node to add at least one transmit receive point, TRP, node to a coordinated multipoint, CoMP, set.

26. The wireless node of claim 17, wherein the processing circuitry is configured to cause the wireless node to apply the at least one interference mitigation procedure by being configured to cause the wireless node to beamform in a direction of a desired signal during the determined at least one time resource, the desired signal being associated with the first network.

27. The wireless node of claim 17, wherein the processing circuitry is configured to cause the wireless node to apply the at least one interference mitigation procedure by being configured to cause the wireless node to null-steer in a direction of an interfering signal during the determined at least one time resource, the interfering signal being associated with the second network.

28. The wireless node of claim 17, wherein the reinforcement learning algorithm is based at least in part on at least one of a measured performance metric and a presence of interference.

29. The wireless node of claim 17, wherein the processing circuitry is configured to cause the wireless node to apply the at least one interference mitigation procedure during at least the at least one time resource by being configured to cause at least one of attenuating an interfering signal, redirecting a desired signal and amplifying the desired signal via at least one active antenna metasurface.

30. The wireless node of claim 17, wherein the processing circuitry is configured to cause the wireless node to apply the at least one interference mitigation procedure during at least the at least one time resource by being configured to cause a re-transmission of a desired signal via at least one mobile relay.

31. The wireless node of claim 17, wherein the wireless node is one of the first network node and the second network node.

32. The wireless node of claim 17, wherein the wireless node is a user equipment communicating in one of the first network and the second network.

* * * * *